United States Patent
Zhao et al.

(10) Patent No.: US 11,050,619 B1
(45) Date of Patent: Jun. 29, 2021

(54) DYNAMIC SUSPENSION OF NETWORK OPERATIONS BY ROOT FOR IMPROVED POWER OUTAGE RECOVERY IN LOW POWER AND LOSSY NETWORK

(71) Applicant: Cisco Technology, Inc., San Jose, CA (US)

(72) Inventors: Li Zhao, Shanghai (CN); Pascal Thubert, Roquefort les Pins (FR); Huimin She, Shanghai (CN); Lele Zhang, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/782,958

(22) Filed: Feb. 5, 2020

(51) Int. Cl.
*H04L 12/24* (2006.01)
*H04L 29/12* (2006.01)
(Continued)

(52) U.S. Cl.
CPC ...... *H04L 41/0816* (2013.01); *H04L 41/0613* (2013.01); *H04L 41/0631* (2013.01); *H04L 45/48* (2013.01); *H04L 61/2015* (2013.01); *H04L 67/12* (2013.01); *H04W 4/38* (2018.02); *H04W 4/70* (2018.02); *H04W 4/80* (2018.02); *H04W 8/005* (2013.01); *H04W 84/18* (2013.01); *Y02D 30/70* (2020.08)

(58) Field of Classification Search
None
See application file for complete search history.

(56) References Cited

U.S. PATENT DOCUMENTS 8,532,149 B2  9/2013  Van Greunen et al.
9,081,567 B1  7/2015  Mahamuni et al.
(Continued)

FOREIGN PATENT DOCUMENTS

KR  101755596 B1  7/2017

OTHER PUBLICATIONS

J. Martocci, Pieter De Mil, W. Vermeylen and Nicolas Riou, Building Automation Routing Requirements in Low Power and Lossy Networks—draft-ietf-roll-building-routing-reqs-02, Jan. 14, 2009, pp. 1-27 (Year: 2009).*

(Continued)

*Primary Examiner* — Christopher M Crutchfield
(74) *Attorney, Agent, or Firm* — Leon R. Turkevich

(57) ABSTRACT

In one embodiment, a method comprises: detecting, by a root network device in a low power and lossy network (LLN) operating in a downward-routing mode, an outage among at least a substantial number of LLN devices in the LLN; initiating, by the root network device, a dynamic suspension of network operations in the LLN during the outage, including causing existing Internet Protocol (IP) addresses of all the LLN devices to be maintained during the outage, and causing all the LLN devices to limit transmissions to Power Outage Notification (PON) messages, Power Restoration Notification (PRN) messages, or minimal-bandwidth data packets, based on the root network device switching the LLN from the downward-routing mode to a collection-only mode; and selectively restoring, by the root network device, the LLN to the downward-routing mode in response to detecting PRN messages from at least substantially all the substantial number of LLN devices.

20 Claims, 5 Drawing Sheets

(51) Int. Cl.
*H04L 12/753* (2013.01)
*H04W 84/18* (2009.01)
*H04L 29/08* (2006.01)
*H04W 8/00* (2009.01)
*H04W 4/70* (2018.01)
*H04W 4/80* (2018.01)
*H04W 4/38* (2018.01)

(56) References Cited

U.S. PATENT DOCUMENTS

| | | | | |
|---|---|---|---|---|
| 9,426,020 | B2 | 8/2016 | Vasseur et al. | |
| 2012/0324273 | A1* | 12/2012 | Shaffer | H04L 45/28 714/4.12 |
| 2013/0010615 | A1* | 1/2013 | Hui | H04L 41/0823 370/252 |
| 2014/0314096 | A1* | 10/2014 | Hui | H04L 45/22 370/400 |
| 2016/0021013 | A1* | 1/2016 | Vasseur | H04L 47/20 370/235 |
| 2017/0127468 | A1* | 5/2017 | Saikusa | H04W 4/70 |
| 2020/0014618 | A1 | 1/2020 | Thubert et al. | |

OTHER PUBLICATIONS

J. Martocci, P. De Mil, N. Riou, W. Vermeylen, Building Automation Routing Requirements in Low-Power and Lossy Networks, Jun. 2010 (Year: 2010).*

P. Thubert, R.A. Jadhav, L. Zhao and D. Barthel, Eliding and Querying RPL Information draft-thubert-roll-eliding-dio-information-03, pp. 1-16, Nov. 17, 2019 (Year: 2019).*

P. Thupert, email discussion of draft-thubert-roll-eliding-dio-information, pp. 1-5, Nov. 21, 2019 (Year: 2019).*

Cisco, "Cisco Connected Grid WPAN Module for CGR 1000 Series Installation and C-Mesh Configuration Guide", [online], Jun. 2017, [retrieved on May 10, 2019]. Retrieved from the Internet: URL: <https://www.cisco.com/c/en/us/td/docs/routers/connectedgrid/modules/wpan/release_5-0/Cisco_Connected_Grid_WPAN_Module_for_CGR_1600_Series_Installation_and_CG-Mesh_Configuration_Guide.pdf>, pp. 1-52.

Cisco, "Connected Utilities—Field Area Network 2.0 Design and Implementation Guide", [online], Jan. 2016, [retrieved on Oct. 10, 2018]. Retrieved from the Internet: URL: <https://www.cisco.com/c/en/us/td/docs/solutions/Verticals/Utilities/Fan/2-0/CU-FAN-2-DIG.pdf>, 182 pages.

Heile et al., "Wi-SUN FAN Overview", Ipwan Internet Draft, Jul. 3, 2017, [online], [retrieved on Aug. 20, 2019]. Retrieved from the Internet: URL: <<https://tools.ietf.org/pdf/draft-heile-lpwan-wisun-overview-00.pdf>, pp. 1-15.

Ko et al., "RPL Routing Pathology in a Network With a Mix of Nodes Operating in Storing and Non-Storing Modes", Network Working Group, Internet Draft, Feb. 12, 2014, [online], [retrieved on Jan. 3, 2020]. Retrieved from the Internet: URL: <https://tools.ietf.org/pdf/draft-ko-roll-mix-network-pathology-04.pdf>, pp. 1-8.

Guo et al., "Resource Aware Hierarchical Routing in Heterogeneous Wireless IoT Networks", 2016 IEEE, [online], [retrieved on Jan. 6, 2020]. Retrieved from the Internet: URL: <https://ieeexplore.ieee.org/document/7537103>, pp. 599-604.

Kayastha et al., "Smart grid sensor data collection, communication, and networking: a tutorial", Wirel. Commun. Mob. Comput. 2014;14, Jul. 23, 2012 [online], [retrieved on Nov. 6, 2019]. Retrieved from the Internet: URL: <https://onlinelibrary.wiley.com/doi/10.1002/wcm.2258>, pp. 1055-1087.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Ko et al., "DualMOP-RPL: Supporting Multiple Modes of Downward Routing in a Single RPL Network", ACM Transactions on Sensor Networks, vol. 11, No. 2, Article 39, Feb. 2015. [online], [retrieved on Jan. 6, 2020]. Retrieved from the Internet: URL: <https://dl.acm.org/citation.cfm?doid=2656931.2700261>, pp. 39:1-39:20.

Zhao et al., U.S. Appl. No. 16/432,661, filed Jun. 5, 2019.
Zhang et al., U.S. Appl. No. 16/574,295, filed Sep. 18, 2019.

* cited by examiner

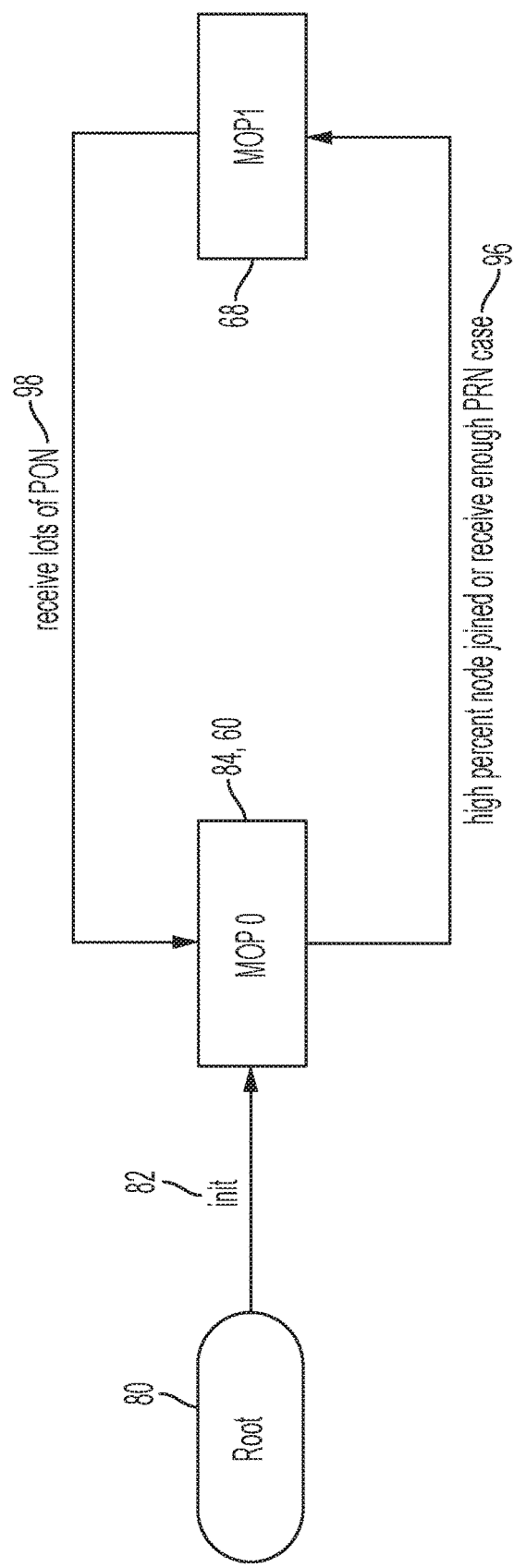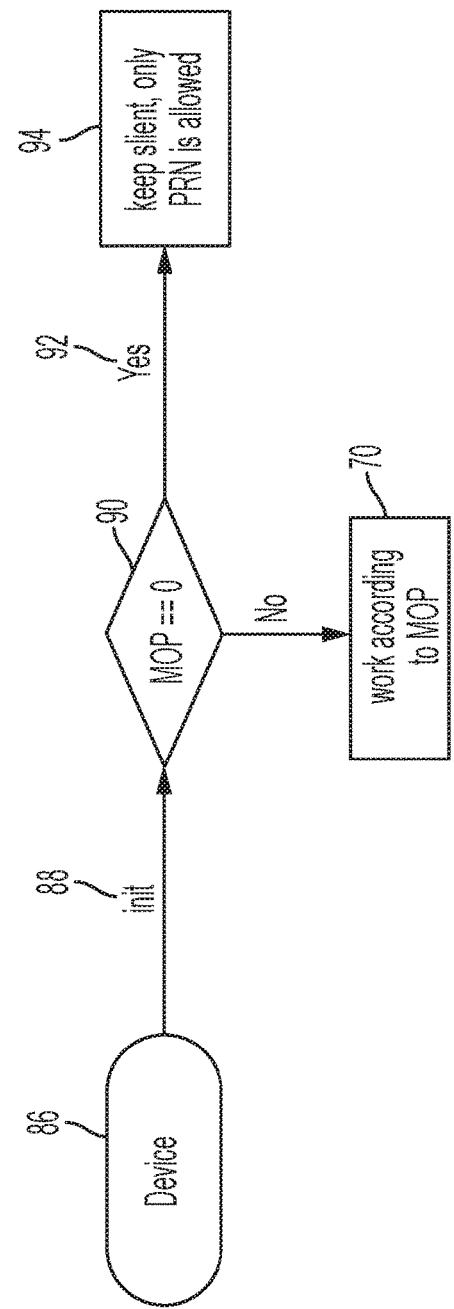
FIG. 4A
FIG. 4B

DYNAMIC SUSPENSION OF NETWORK OPERATIONS BY ROOT FOR IMPROVED POWER OUTAGE RECOVERY IN LOW POWER AND LOSSY NETWORK

TECHNICAL FIELD

The present disclosure generally relates to dynamic suspension of network operations by a root for improved power outage recovery in a low power and lossy network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Large-scale wireless mesh networks can be deployed in the form of Internet Protocol version 6 (IPv6) wireless radio frequency (RF) mesh networks, deployed for example using wireless link layer protocols such as IEEE 802.15.4e and/or IEEE 802.15.4g (referred to herein as "IEEE 802.15.4e/g"), and/or Wireless Smart Utilities Network (Wi-SUN) according to the example IETF Internet Draft by Heile et al., "Wi-SUN FAN Overview" (draft-heile-lpwan-wisun-overview-00). Such large-scale wireless mesh networks (also referred to as field area networks (FANs)) can be used for deployment of, for example, a connected grid mesh (CG-mesh) network advanced metering infrastructure (AMI). The CG-mesh network can include hundreds or thousands of IEEE 802.15.4e/g based resource-constrained (e.g., low-power) network devices (also referred to herein as Low Power and Lossy Network (LLN) devices), where each LLN device can reach, within its transmission range, hundreds of neighboring network devices.

The Low-power and Lossy Network (LLN) can include dozens or thousands of low-power network devices: in some cases the LLN can be limited to a wireless mesh network; the LLN devices also can be configured for routing data packets according to a routing protocol designed for such low power and lossy networks (RPL). The low-power devices, also referred to as "constrained devices" can be constrained by processing power, memory, and energy (e.g., battery power), and therefore may require substantially-long sleep states ("standby" states) in between with relatively-short active states for execution of different execution states. Further, noise and/or interference on a wireless RF channel can affect communications between LLN devices, resulting in unreliable data links that can be constrained by high loss rates, low data rates, and instability with relatively low packet delivery rates in the LLN.

A problem in a deploying large-scale LLN is that a power outage can cause a substantial disruption in network operations due to existing data traffic and routing protocol messages interfering with power outage notification (PON) messages generated by the LLN devices in response to the power outage. Such interference with the PON messages can prevent a centralized root network device from receiving the PON messages, where time is critical that the root network device can receive the PON messages from the LLN devices before the constrained batteries in the LLN devices lose all reserve power. Interference in the LLN also can interfere substantially with attempts to complete recovery after power restoration, as data traffic and routing protocol messages can interfere with LLN device attempts to obtain an Internet Protocol (IP) address and joint the LLN.

BRIEF DESCRIPTION OF THE DRAWINGS

Reference is made to the attached drawings, wherein elements having the same reference numeral designations represent like elements throughout and wherein:

FIGS. 4A and 4B illustrate state diagrams of execution states in the root network device and a constrained LLN device, according to an example embodiment.

DESCRIPTION OF EXAMPLE EMBODIMENTS

Overview

Figure 1:
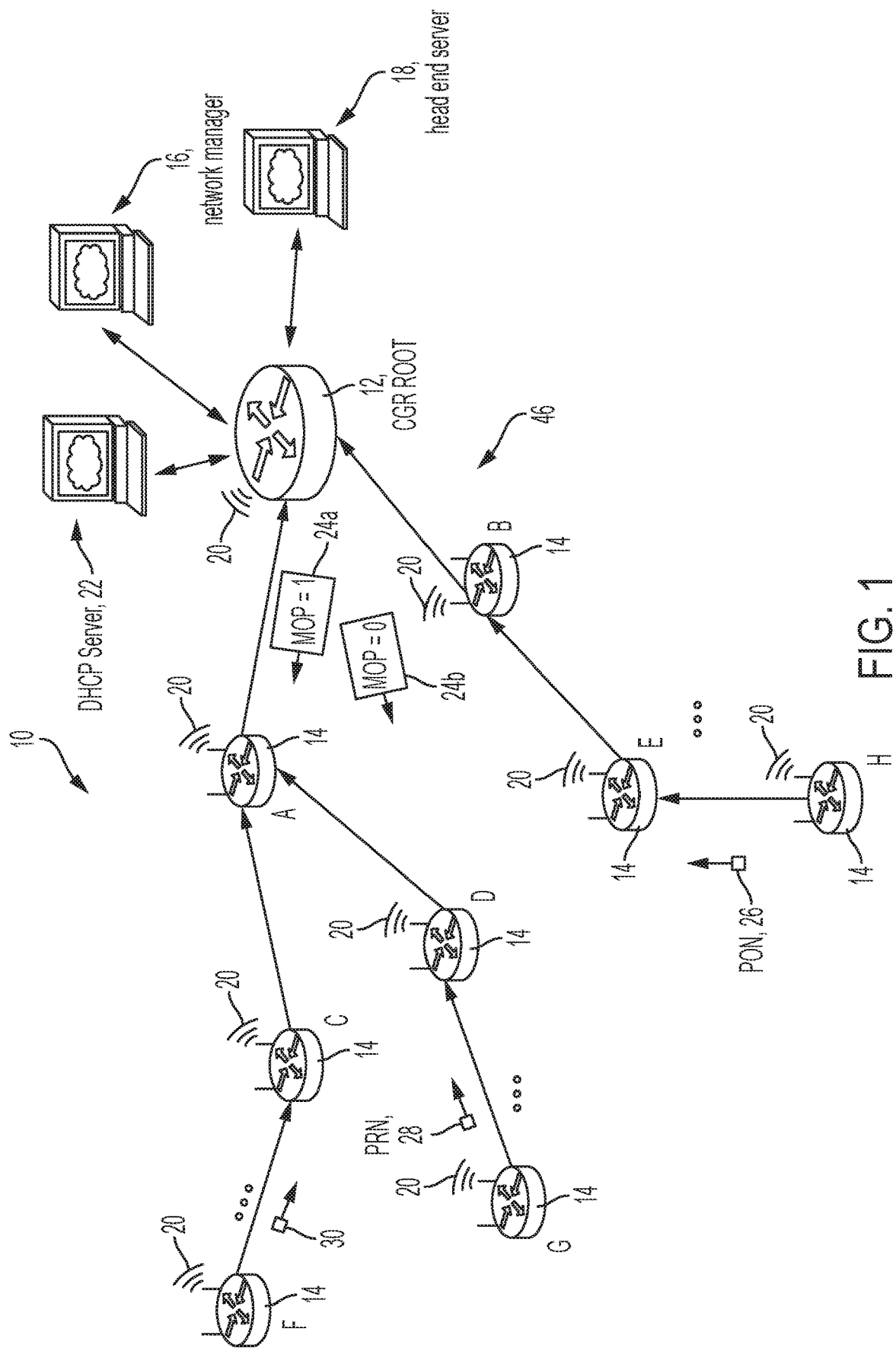
FIG. 1 illustrates an example system having a root network device for executing improved outage recovery in a low power and lossy network (LLN), based on initiating a dynamic suspension of network operations in response to a detected outage, according to an example embodiment.

In one embodiment, a method comprises: detecting, by a root network device in a low power and lossy network (LLN) operating in a downward-routing mode, an outage among at least a substantial number of constrained LLN devices in the LLN; initiating, by the root network device, a dynamic suspension of network operations in the LLN during the outage, including causing existing Internet Protocol (IP) addresses of all the constrained LLN devices to be maintained during the outage, and causing all the constrained LLN devices to limit transmissions to Power Outage Notification (PON) messages, restoration messages, or minimal-bandwidth data packets, based on the root network device switching the LLN from the downward-routing mode to a collection-only mode; and selectively restoring, by the root network device, the LLN to the downward-routing mode in response to detecting the restoration messages from at least substantially all the substantial number of constrained LLN devices.

In another embodiment, an apparatus comprises apparatus implemented as a physical machine, the apparatus comprising: non-transitory machine readable media configured for storing executable machine readable code; a device interface circuit configured for receiving a data packet in a low power and lossy network (LLN); and a processor circuit. The processor circuit is configured for executing the machine readable code, and when executing the machine readable code operable for: detecting, by the apparatus implemented as a root network device in the LLN operating in a downward-routing mode, an outage among at least a substantial number of constrained LLN devices in the LLN; initiating, by the root network device, a dynamic suspension of network operations in the LLN during the outage, including causing existing Internet Protocol (IP) addresses of all the constrained LLN devices to be maintained during the outage, and causing all the constrained LLN devices to limit transmissions to Power Outage Notification (PON) messages, restoration messages, or minimal-bandwidth data packets, based on the root network device switching the LLN from the downward-routing mode to a collection-only mode; and selectively restoring, by the root network device, the LLN to the downward-routing mode in response to detecting the restoration messages from at least substantially all the substantial number of constrained LLN devices.

In another embodiment, one or more non-transitory tangible media encoded with logic for execution by a machine and when executed by the machine operable for: detecting, by the machine implemented as a root network device in a low power and lossy network (LLN) operating in a downward-routing mode, an outage among at least a substantial number of constrained LLN devices in the LLN; initiating, by the root network device, a dynamic suspension of network operations in the LLN during the outage, including causing existing Internet Protocol (IP) addresses of all the constrained LLN devices to be maintained during the outage, and causing all the constrained LLN devices to limit transmissions to Power Outage Notification (PON) messages, restoration messages, or minimal-bandwidth data packets, based on the root network device switching the LLN from the downward-routing mode to a collection-only mode; and selectively restoring, by the root network device, the LLN to the downward-routing mode in response to detecting the restoration messages from at least substantially all the substantial number of constrained LLN devices.

DETAILED DESCRIPTION

Particular embodiments enable a root network device in a large-scale low power and lossy network (LLN) to optimize outage recovery (e.g., power outage recovery) in the LLN: the root network device can respond to detecting an outage among a substantial number of constrained LLN devices by initiating a dynamic suspension of network operations in the LLN during the detected outage. The root network device can implement the dynamic suspension of network operations based on causing existing Internet Protocol (IP) addresses of the constrained LLN devices to be maintained during the outage, and based on causing all the constrained LLN devices to limit transmissions to essential messages such as Power Outage Notification (PON) messages, restoration messages such as Power Restoration Messages (PRN) messages, and optionally minimal-bandwidth messages such as metering data. As described below, the root network device can cause the constrained LLN devices to limit transmissions based on changing the mode of operation of the LLN from a downward-routing mode (e.g., a storing mode or a nonstoring mode) to a collection-only mode that eliminates "downward" forwarding of data packets from the root network device into the LLN.

The dynamic suspension of network operations can result in a dynamic suspension of "control-plane" messages that consume substantial wireless network bandwidth that can otherwise interfere with high-priority PON messages or high-priority PRN messages. For example, the maintaining of IP addresses of constrained LLN devices by the root network device enables temporary suppression of any message regarding allocating or extension of an IP address (e.g., any messaging by a constrained LLN device with a DHCP server or any IPv6 Neighbor Discovery (ND) related messaging). The dynamic suspension of network operations by the root network device changing from a downward-routing mode to a collection-only mode also can cause each of the constrained LLN devices to suppress transmission of any advertisement message toward the root network device, for example a Destination Advertisement Object (DAO) message.

Hence, the root network device according to the example embodiments can eliminate non-essential messages that can interfere with reception, by the root network device, of PON messages that are generated and output by the constrained LLN devices. Hence, the root network device can ensure that PON messages output by the constrained LLN devices encounter minimal interference, for reception thereof by the root network device before depletion of battery power by the constrained LLN devices following a power outage.

The example embodiments also enable the root network device to provide rapid recovery of the lower power and lossy network upon power restoration based on maintaining the dynamic suspension of the network operations (including causing suppressing transmission by the constrained LLN devices of advertisement messages, messages regarding IP address allocation, or management messages directed to a network manager), until the root network device has received restoration messages (e.g., PRN messages) from substantially all (e.g., ninety-five percent (95%)) of the affected constrained LLN devices in the LLN.

Hence, the example embodiments enable a root network device in an example LLN with one thousand or more constrained LLN devices to receive PRN messages from ninety-five percent (95%) or more of the constrained LLN devices following power restoration (e.g., the earlies "restore time" as time stamped in a data structure generated by a network device having detected the power restoration).

FIG. 1 illustrates an example LLN network 10 implemented as a wireless mesh data network, for example an IEEE 802.15.4e/g based CG-mesh network having a root mesh network device 12 configured for operating as a directed acyclic graph (DAG) root for multiple constrained LLN devices 14 implemented as wired or wireless mesh network devices, according to an example embodiment. The root network device "CGR ROOT" 12 can be implemented, for example, as a commercially-available Cisco® 1000 Series Connected Grid Router (CGR) from Cisco Systems, San Jose, Calif., that is modified as described herein; hence, the root mesh network device 12 also can be referred to herein as a CGR 12 or DAG root 12, or a root network device 12.

The root network device 12 can serve as a "sink" for the constrained LLN devices 14, for example the root network device 12 enables the wireless constrained LLN devices 14 to reach one or more network devices 16, 18, and/or 22. As illustrated in FIG. 1, each constrained LLN device 14 in the wireless mesh data network 10 can establish a link layer mesh topology via wireless data links 20. Each constrained LLN device 14 can be implemented as a constrained network device, or "LLN device" or "CG-mesh" device, configured for operating for example as a RPL node according to the Internet Engineering Task Force (IETF) Request for Comments (RFC) 6550.

The root network device 12 can provide a link layer connection (e.g., via a wireless data link, a high-speed wired backbone link, etc.) and/or a network layer connection overlying the link layer connection (e.g., via a wide area network such as the Internet) for reaching the network manager device 16, the head-end server device 18, and/or a Dynamic Host Configuration Protocol (DHCP) server 22. Hence, each constrained LLN device 14 can be configured for address autoconfiguration, for example based on exchanging messages (via the root network device 12) with the DHCP server device 22, or based on IPv6 Neighbor Discovery (IPv6 ND). Hence, each constrained LLN device 14 can establish a tree-based network topology overlying the wireless mesh data network 10, described below, that is rooted at the root network device 12. Each constrained LLN device 14 also can send and receive messages associated with various network management-based services provided by the network manager device 16 via the root network device 12; each constrained LLN device 14 also can send and receive messages associated with various application services provided by the head-end server device 18 via the root network device 12.

The root network device 12 can be configured for causing creation of a tree-based topology overlying the link layer mesh data network 10 based on transmitting one or more DODAG information object (DIO) messages 24, for example according to RFC 6550. Each constrained LLN device 14 in the LLN 10 can join the DODAG 46 via wireless data links 20 in response to receiving the multicast DIO message 24. The wireless mesh data network 10 can be implemented as a Low-power and Lossy Network (LLN) that can include dozens or thousands of low-power wireless mesh network devices 14 each configured for routing data packets according to a routing protocol designed for such low power and lossy networks, for example RPL: such low-power router devices can be referred to as "RPL nodes"; hence, a constrained LLN device 14 also can be referred to herein as a "RPL node" or a wireless network device. Each RPL node 14 in the LLN typically is constrained by processing power, memory, and energy (e.g., battery power); interconnecting wireless data links 20 between the RPL nodes 14 typically are constrained by high loss rates, low data rates, and instability with relatively low packet delivery rates.

A network topology (e.g., a "RPL instance" according to RFC 6550) can be established based on creating routes toward a single "root" network device 12 in the form of a directed acyclic graph (DAG) toward the root network device 12, where all routes in the LLN terminate at the root network device 12 (also referred to as a "DAG destination"). Hence, the DAG also is referred to as a Destination Oriented DAG (DODAG). Network traffic can move either "up" towards the DODAG root 12 or "down" towards the DODAG leaf nodes (e.g., nodes "F", "G", "H" or beyond).

The DODAG 46 can be formed based on the DIO message 24 advertised by the DAG root 12, where a "child" network device (e.g., "A") 14 detecting the DIO can select the DAG root 12 as a parent in the identified DODAG based on comparing network topology metrics (advertised in the DIO) to a prescribed objective function of the RPL instance. The "child" network device (e.g., "A") 14, upon attaching to its parent, can output its own DIO with updated network topology metrics that enable other wireless constrained LLN devices 14 to discover the DODAG 46, learn the updated network topology metrics, and select a DODAG parent. Hence, the constrained LLN devices 14 in the LLN 10 can join the DODAG 46 in response to receiving a multicast DIO message from an advertising DODAG parent device, and selecting the DODAG parent as a default route.

A single instance of the DODAG or DAG also is referred to as a Personal Area Network (PAN). Hence, a wireless mesh data network 10 can include a plurality of PANs (not shown in FIG. 1), where each PAN includes one DAG root 12 (exclusively allocated to the PAN) and multiple wireless constrained LLN devices 14 connected exclusively within the PAN according to the DIO messages originated by the corresponding one DAG root 12. Hence, unless explicitly stated otherwise herein, a constrained LLN device 14 is configured to belong to only one PAN at a time, i.e., a constrained LLN device 14 is configured to be attached only within one DODAG, although the constrained LLN device 14 can be configured for attachment to one or more parent network devices 14 within a single DODAG.

The root network device 12 can specify within the DIO message 24 a Mode of Operation (MOP) field value that identifies the mode of operation for the RPL instance: according to RFC 6550, the MOP field is administratively provisioned at and distributed by the DODAG root, where all nodes who join the DODAG must be able to honor the MOP in order to fully participate as a router (else they must only join as a leaf). Hence, a MOP field value of "0" identifies no downward routes are maintained by the root network device 12 or any constrained LLN device 14 (i.e., the DODAG operates in a collection-only mode); a MOP field value of "1" identifies the DODAG operates in a non-storing mode (where only the root network device 12 maintains downward routes and source routes each data packet to a destination constrained LLN device 14); and a MOP field value of "2" identifies the DODAG operates in a storing mode, where each constrained LLN device 14, e.g., "A", stores a next-hop route for reaching an attached child network device such as "C" or "D" 14. A MOP field value of "3" identifies the DODAG operates in a storing mode with multicast support.

Hence, downward routes (i.e., away from the DAG root) can be created in any one of the three available types of downward-routing mode in response to a constrained LLN device 14 receiving a DIO message 24 specifying a MOP field value of "1", "2", or "3" for the RPL instance, however no downward routes can be created in the collection-only mode if the DIO message 24 specifies a MOP field value of "0" (i.e., "MOP=0"). If downward routes are permitted as specified by the MOP field value "1", "2", or "3" in the DIO message 24, a DIO message 24 can respond by generating and transmitting a Destination Advertisement Object (DAO) message: in nonstoring mode the DAO is unicast transmitted by the constrained LLN device 14 to the DAG root 12, whereas in storing mode the DAO message is unicast transmitted by the constrained LLN device 14 to each of its parents. Hence, in storing mode a RPL node unicasts its DAO message to its parent node, such that RPL nodes can store downward routing tables for their "sub-DAG" (the "child" nodes connected to the RPL node). In non-storing mode the RPL nodes do not store downward routing tables, hence a RPL node unicasts its DAO message to the DAG root, such that all data packets are sent to the DAG root and routed downward with source routes inserted by the DAG root.

The DAG root 12, in response to receiving the DAO messages from the RPL nodes 14 based on the DIO message 24 specifying nonstoring mode, can build the entire DAG topology and store the DAG topology in its memory circuit 34 (illustrated in FIG. 2), including storage of heuristics of usage, path length, knowledge of device capacity, link reliability, etc.

Although the LLN 10 is illustrated as a DODAG having a root network device 12 and multiple-hop paths for reaching leaf network devices (e.g., "F", "G", and/or "H"), the LLN 10 also can be implemented as a Wi-SUN based network having a star topology or cluster topology.

As described previously, a DIO message 24 generated and output by the root network device 12 in accordance with RFC 6550 specifies one and only one Mode of Operation (MOP) value for the duration of the RFC instance in order ensure the topological stability of the DODAG.

Conventional deployments of a constrained LLN device 14 within an LLN 10 involve the constrained LLN device 14 on initial boot (and on power restore) executing neighbor discovery (e.g., IPv6 Neighbor Discovery), joining the DODAG and sending a DAO message, and exchanging DHCP messages with the DHCP server device 22 to obtain an IP address; the constrained LLN device 14, in response to receiving the DHCP-allocated IP address, then registers the allocated IP address with the network manager device 16 executing network management operations; the constrained LLN device 14 also registers the allocated IP address with the head-end server device 18 executing application operations (e.g., CG-mesh based electrical grid metering operations, etc.). Since typical deployments involve an incremental addition of a constrained LLN device 14 to the LLN 10, the relative addition of one or a few constrained LLN devices 14 at a given point in time does not result in any substantial impact on the existing network traffic in the LLN 10. However, conventional deployments that utilize the same boot procedure following power restoration impose a substantial burden on the LLN 10, as the above-described messaging can cause substantial interference with the other thousands of constrained LLN devices 14 attempting to recover from an outage, especially since the traffic generated by the constrained LLN devices 14 closer to the root network device 12 can interfere with other child network devices further from the root network device 12. Hence, the constrained LLN devices 14 that are "deep" in the LLN 10 (e.g., ten to twenty hops from the root network device 12) can be delayed by hours or days to fully report a PRN message 28 after an outage.

Hence, existing network operations in conventional deployments of a downward-routing mode (e.g., a storing mode or a nonstoring mode) DODAG can substantially interfere with attempts by one or more constrained LLN devices 14 to send to the root network device 12 a PON message 26 indicating a power outage, which can delay corrective action to resolve the power outage; further, existing network operations in a downward-routing mode DODAG can substantially interfere with attempts to restore the DODAG following power restoration, as typically each constrained LLN device 14 may be transmitting various messages such as DHCP related messages, management messages to the network manager device 16, etc., that may interfere with the transmissions of PRN messages 28 by recovering constrained LLN devices 14.

As described in further detail below, according to example embodiments the root network device 12 can initiate a dynamic suspension of network operations in the LLN 10 in response to detecting an outage (e.g., a power outage) among at least a substantial number of the constrained LLN devices 14. The dynamic suspension of network operations in the LLN 10 can include the root network device 12 causing any IP addresses in use to be extended during the outage, for example based on sending one or more instructions to the DHCP server device 22 to automatically extend IP address leases of the affected constrained LLN devices 14 for a prescribed time interval; the dynamic suspension of network operations in the LLN 10 can include the root network device 12 changing the DODAG from a downward-routing mode to a collection-only mode for example based on changing the MOP value in the nonstoring mode DIO message 24a from a "1" value to a "0" value, causing each of the constrained LLN devices 14 to suppress transmission of any DAO messages in response to the collection-only mode DIO message 24b specifying the "MOP=0" value; the "MOP=0" value in the collection-only mode DIO message 24b also can cause all the constrained LLN devices 14 to limit transmissions to PON messages 26, PRN messages 28, and/or minimal-bandwidth data packets 30. The root network device 12 changing the DODAG from a downward-routing mode to a collection-only mode also can cause the root network device 12 to suppress transmission of any downward traffic (originated by any one of the network manager device 16, the head-end server device 18, and/or the DHCP server device 22) to any of the constrained LLN devices 14 in the LLN 10.

Hence, the collection-only mode DIO message 24b can minimize network traffic in the LLN 10 during the outage, enabling the root network device 12 to receive the PON messages 26 and PRN messages 28 generated by the constrained LLN devices 14 without interference.

Figure 2:
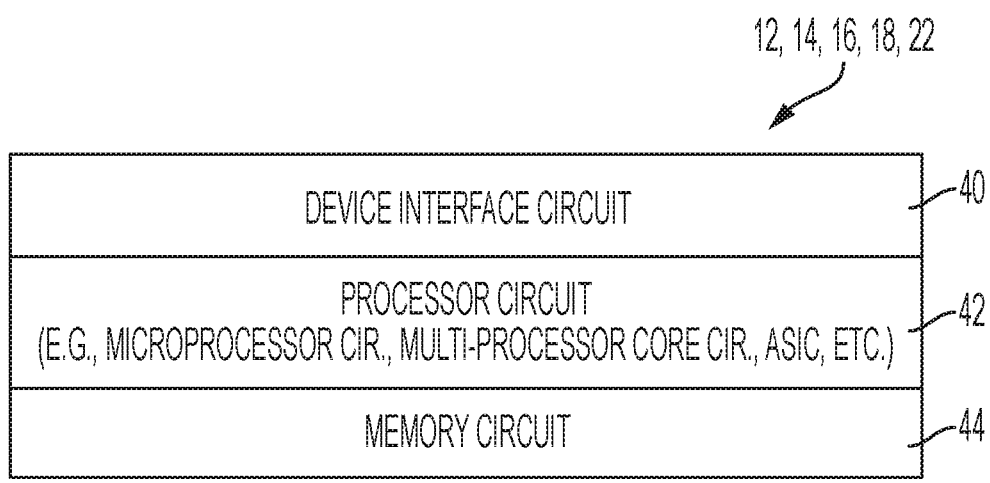
FIG. 2 illustrates an example implementation of any one of the network devices of FIG. 1, according to an example embodiment.

FIG. 2 illustrates an example implementation of any one of the devices 12, 14, 16, 18, and/or 22 of FIG. 1, according to an example embodiment. Each apparatus 12, 14, 16, 18, and/or 22 is a physical machine (i.e., a hardware device) configured for implementing network communications with other physical machines via the network 10. The term "configured for" or "configured to" as used herein with respect to a specified operation refers to a device and/or machine that is physically constructed and arranged to perform the specified operation.

Each apparatus 12, 14, 16, 18, and/or 22 can include a device interface circuit 40, a processor circuit 42, and a memory circuit 44. The device interface circuit 40 can include one or more distinct physical layer transceivers for communication with any one of the other devices 12, 14, 16, 18, and/or 22; the device interface circuit 40 also can include an IEEE based Ethernet transceiver for communications with the devices of FIG. 1 via any type of data link, as appropriate (e.g., a wired or wireless link, an optical link, etc.). The processor circuit 42 can be configured for executing any of the operations described herein, and the memory circuit 44 can be configured for storing any data or data packets as described herein.

Any of the disclosed circuits of the devices 12, 14, 16, 18, and/or 22 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 3A:
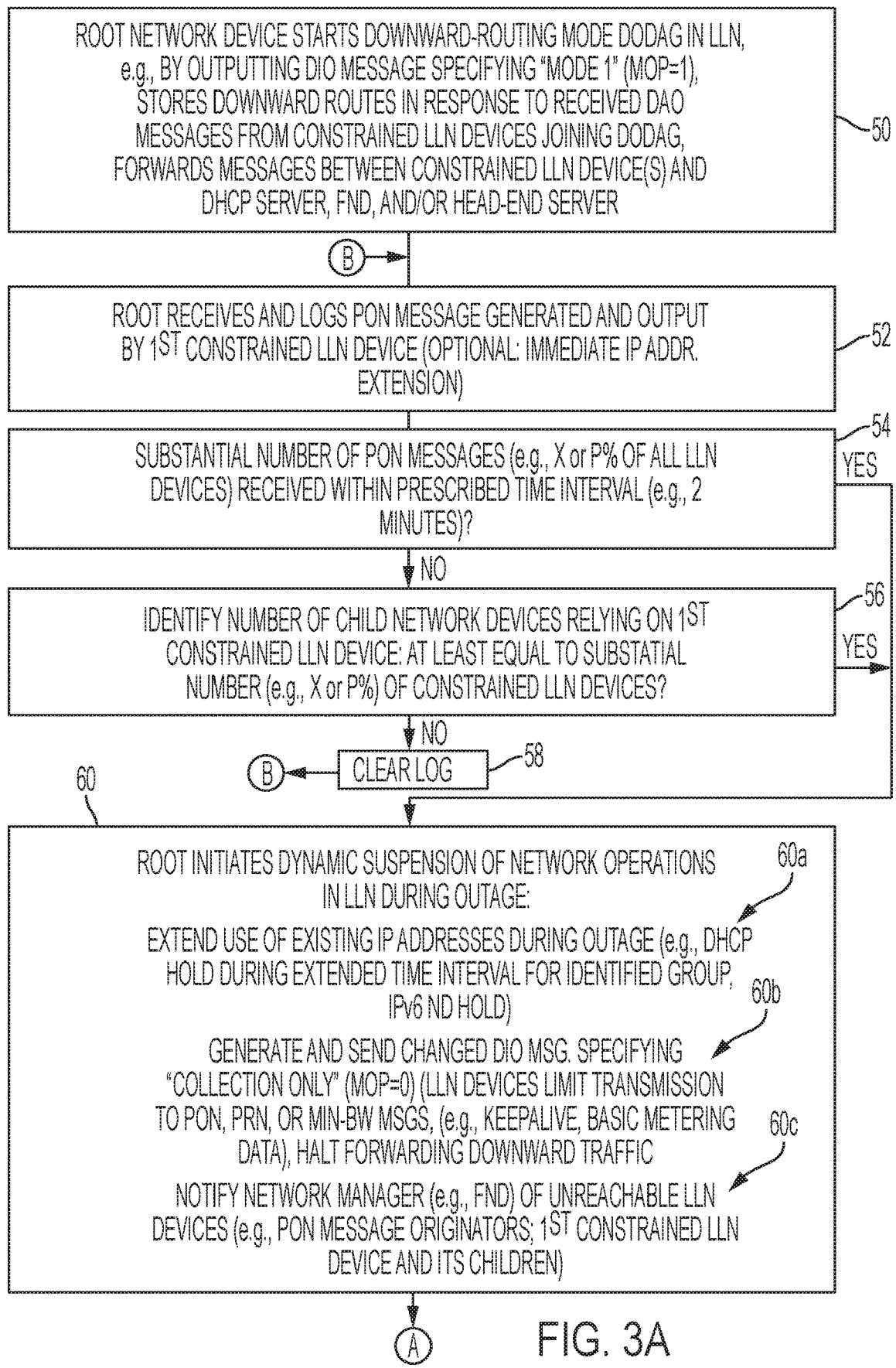
FIGS. 3A and 3B illustrate an example method of the root network device executing improved outage recovery in a low power and lossy network (LLN) based on initiating a dynamic suspension of network operations in response to a detected outage, according to an example embodiment.
Figure 3B:
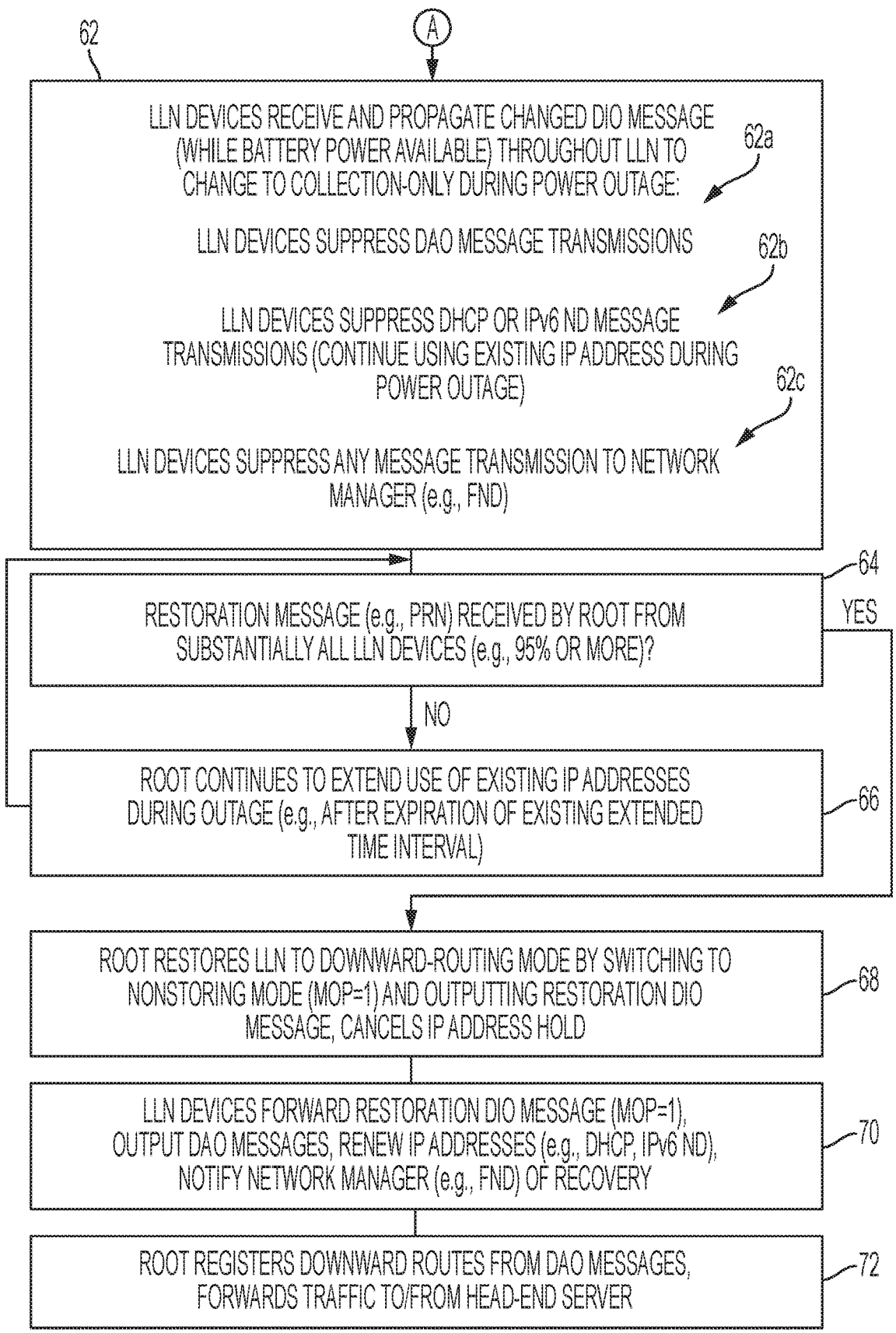

FIGS. 3A and 3B illustrate an example method of the root network device executing improved outage recovery in a low power and lossy network (LLN) based on initiating a dynamic suspension of network operations in response to a detected outage, according to an example embodiment. FIGS. 4A and 4B illustrate state diagrams of execution states in the root network device and a constrained LLN device, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 3A, the processor circuit 42 of the root network device 12 in operation 50 can start generation of a downward-routing mode DODAG in the LLN 10, for example based on outputting a nonstoring mode DIO message 24a specifying the nonstoring mode "Mode 1" ("MOP=1") as described in detail in RFC 6550. As described previously, each constrained LLN device 14 receiving the nonstoring mode DIO message 24a can respond by selectively joining the DODAG (46 of FIG. 1) by selecting an attachment router (e.g., "A" selects the root network device 12; "C" selects "A", etc.), outputting an updated DIO message 24 specifying updated topology metrics (e.g., rank value), and unicast transmitting a DIO message to the root network device 12.

The processor circuit 42 of the root network device 12 in operation 50 can store downward routes for reaching the constrained LLN devices 14 in response to the received DAO messages from the respective constrained LLN devices 14, and upon establishment of the downward routes (using source-routing) can forward messages between the constrained LLN devices 14 and other network devices such as the network manager device (also referred to as the "Field Network Director" (FND)) 16, the head-end server device 18, and/or the DHCP server device 22. Although the LLN 10 of FIG. 1 illustrates only the constrained network devices "A" through "H", the LLN 10 during actual deployment can include over one thousand (e.g., tens of thousands) of constrained LLN devices 14 rooted by the root network device 12.

Following establishment of the DODAG 46, the processor circuit 42 of the root network device 12 in operation 52 can detect an outage in the LLN 10 in response to receiving an outage notification, for example a PON message 26, from at least one of the constrained LLN devices 14 (e.g., "A"). The processor circuit 42 of the root network device 12 in operation 52 can respond to the PON message 26 by logging the constrained LLN device 14 (e.g., "A") having sent the PON message 26 (e.g., by IP address); the processor circuit 42 of the root network device 12 in operation 52 also can initiate an immediate IP address extension for all of the constrained LLN devices 14, for example based on sending a DHCP "hold" message to the DHCP server device 22, the DHCP "hold" message specifying that all devices of an identified class (all the constrained LLN devices 14 in the LLN 10) automatically have their IP address leases extended by a prescribed time interval (e.g., an additional hour, an additional twenty-four (24) hours, etc., as appropriate).

The processor circuit 42 of the root network device 12 in operation 54 can determine whether a substantial number of the constrained LLN devices 14 have encountered an outage. In one example, the processor circuit 42 of the root network device 12 in operation 54 can determine whether a substantial number of PON messages 26 (e.g., a prescribed number "X" or a percentage "P %" from all constrained LLN devices 14) has been received within a prescribed time interval (e.g., two (2) minutes, fifteen (15) minutes, etc.) of receiving the initial PON message 26 in operation 52. The prescribed time interval for receiving the PON messages 26 can be based on the expected reserve battery lifetime of the constrained LLN devices 14 following a power outage.

If in operation 54 the processor circuit 42 of the root network device 12 determines a substantial number of PON messages 26 have not been received within the prescribed time interval, the processor circuit 42 of the root network device 12 in operation 56 can identify from its stored topology tables (e.g., in the memory circuit 44 and generate in operation 50 based on the received DAO messages) the number child network devices that rely on reachability to the root network device 12 via the first constrained LLN device 14 (e.g. "A") having transmitted the PON message 26 received by the root network device 12 in operation 52. For example, the first constrained LLN device 14 (e.g., "A") may have transmitted an outage notification in the form of a "reboot" message or "trouble" message indicating the first constrained LLN device 14 will be temporarily unavailable:

depending on implementation, the loss of the first constrained LLN device 14 (e.g. "A") can cause a substantial disruption in the LLN 10 if the first constrained LLN device 14 is a parent of a substantial number of children. Hence, if in operation 56 the processor circuit 42 of the root network device 12 determines the number of child network devices is less than the substantial number (indicating the reported outage by "A" 14 is of insufficient influence to suppress network operations), the processor circuit 42 of the root network device 12 in operation 58 can either wait for additional PON messages 26 or clear its log entries and maintain existing network operations.

If in operation 54 the processor circuit 42 of the root network device 12 determines that the root network device 12 has received a substantial number of PON messages 26, or if in operation 56 the processor circuit 42 of the root network device 12 determines a substantial number of child network devices (e.g., equal to or greater than "X" or "P %") (e.g., P=85%) are children that rely on the reachability of the first constrained LLN device 14 (e.g., "A"), the processor circuit 42 of the root network device 12 can determine that the outage is sufficient among the substantial number of constrained LLN devices 14 as to warrant ceasing suspension of network operations to avoid interference with reception of any other outage messages (e.g., PON messages 26) during the outage, or to avoid interference of any messages required by the first constrained LLN device 14 (or its children) that would be generated upon restoration.

Hence, the processor circuit 42 of the root network device 12 in operation 60 can initiate dynamic suspension of the network operations in the LLN 10 in response to detecting the outage among the substantial number of constrained LLN devices 14. The processor circuit 42 of the root network device 12 in operation 60 can execute numerous operations that can dynamically suspend operations in the LLN 10, causing network traffic to be minimized to prevent interference in receiving any PON messages 26 or PRN messages 28 from the constrained LLN devices 14. For example, the processor circuit 42 of the root network device 12 in operation 60a can extend use of the existing IP addresses by all the constrained LLN devices 14 during the outage, for example based on generating and sending a DHCP hold instruction to the DHCP server device 22: the DHCP hold instruction can request the DHCP server device 22 extend and maintain the IP addresses of the constrained LLN devices 14 (e.g., associated with an identified group specified in the DHCP hold instruction) for a prescribed time extension interval (e.g., one hour, one day, etc.). The processor circuit 42 of the root network device 12 in operation 60a also can generate and output an IPv6 Neighbor Discovery hold message that suspends IPv6 Neighbor Discovery in the LLN 10 and causes the constrained LLN devices 14 to use their existing addresses (alternately the IPv6 ND hold message can be added as an option to the collection-only mode DIO message 24b generated and output in operation 60b, or each constrained LLN device 14 can be configured for halting IPv6 ND in response to the collection-only mode DIO message 24b without need for any further IPv6 ND hold parameters in the collection-only mode DIO message 24b).

The processor circuit 42 of the root network device 12 in operation 60b can generate and transmit into the LLN 10 (via the device interface circuit 40) the collection-only mode DIO message 24b specifying the "collection-only" mode of operation ("MOP=0"). As described previously, the collection-only mode DIO message 24b can cause each constrained LLN device 14 to limit transmissions to a PON message 26, a PRN message 28, or a minimum-bandwidth message (e.g., less than one kilobyte) such as a keep-alive message, or basic metering data that does not include any large data structures such as security keys, etc. The processor circuit 42 of the root network device 12 in operation 60b also can halt any forwarding of downward traffic into the LLN 10 (e.g., generated and output by the network manager device 16 or the head-end server device 18).

The processor circuit 42 of the root network device 12 in operation 60c can cause the network manager device 16 and/or the head-end server device 18 to suspend traffic toward the LLN 10, for example based on generating and sending a message notifying the network manager device 16 (e.g., the FND) of the unreachable LLN devices: the message can identify the LLN 10 as a whole, or a selected subset (e.g., the PON message originators, or the first constrained LLN device 14 and its children).

Referring to FIG. 3B, the constrained LLN devices 14 in operation 62 receive and propagate the collection-only mode DIO message 24b that was changed by the root network device 12 from the prior nonstoring mode DIO message 24a. Each constrained LLN device 14 (starting with the first-hop child network devices "A" and "B") can propagate the collection-only mode DIO message 24b throughout the LLN 10 to change the DODAG 46 from a nonstoring mode DODAG to a collection-mode DODAG. In particular, each constrained LLN device 14 in operation 62a suppresses DAO message transmissions, suppresses in operation 62b any DHCP and/or IPv6 Neighbor Discovery related messages and continues to use its existing IP address, and suppresses in operation 62c any message transmissions to the network manager device 16. As described previously, the collection-only DIO message 24b can include an IPv6 ND hold option; alternately, each constrained LLN device 14 can be configured for halting all DHCP and/or IPv6 ND operations in response to detecting the "MOP=0" value in the collection-only mode DIO message 24b.

Hence, the collection-only mode DIO message 24b causes each of the constrained LLN devices 14 to suppress transmissions of any unnecessary messages (e.g., DAO messages, IP address allocation-related messages, messages to the network manager device 16, etc.) that would interfere with the root network device 12 receiving any PON message 26 or any PRN message 28. As described previously, depending on implementation, transmissions can be limited to a PON message 26, a PRN message 28, and/or a minimal-bandwidth message that can be deemed (relative to its importance) to not interfere with any PON message 26 or any PRN message 28.

Hence, the collection-only mode by the DODAG 46 results in minimal traffic in the LLN 10 during the outage, enabling the root network device 12 to detect any additional PON message 26 or a PRN message 28 indicating an initiation of recovery in the LLN 10.

If in operation 62 the processor circuit 42 of the root network device 12 determines that a restoration message (e.g., a PRN message 28) has not been received from substantially all the affected constrained LLN devices 14 (e.g., 95% or more of the affected constrained LLN devices 14), the processor circuit 42 of the root network device 12 can selectively extend in operation 66 the use of existing IP addresses during the outage, for example in response to a detected expiration of the existing time interval that was previously output by the constrained LLN device 14 for the existing IP addresses.

In response to the processor circuit 42 of the root network device 12 determining in operation 64 that a restoration message (e.g., a PRN message 28) has been received from substantially all the affected constrained LLN devices 14, the processor circuit 42 of the root network device 12 in operation 68 can restore the LLN 10 from collection-only mode to downward-routing mode (e.g., storing mode or nonstoring mode, as appropriate) by switching from the collection-only mode DIO message 24b to the nonstoring mode DIO message 24a, and outputting the "restoration" DIO message 24a that identifies the DODAG 46 has resumed operating in nonstoring mode. The processor circuit 42 of the root network device 12 also can generate and output an instruction (e.g., to the DHCP server device 22) that cancels the IP address hold.

The processor circuit 42 of the root network device 12 also can execute operation 68 in response to determining, in operation 64, that a "timeout" interval has occurred following reception of a first received PRN message 28, or following reception of a second (smaller) percentage (e.g., 60%); hence, the timeout interval accounts for instances where a constrained LLN device 14 (e.g., "F") in the LLN 10 was considered as "lost" (due to a reported outage by its parent "C") but never encountered power loss. Hence, the prioritizing of PRN messages 28 by suspending network operations can be terminated after an identifiable timeout interval that indicates restoration of network operations has a higher priority than waiting for any remaining PRN messages 28.

Each of the constrained LLN devices 14 in operation 70 can respond to the restoration DIO message 24a by outputting updated DIO messages 24a (including updated rank values), generating and unicast transmitting DAO messages to the root network device 12, renewing IP addresses (e.g., based on DHCP-based messages to the DHCP server device 22 or based on IPv6 Neighbor Discovery messaging), and updating recovery and registration information with the network manager device 16.

The processor circuit 42 of the root network device 12 in operation 72 can resume registration of downward routes in response to the received DAO messages, and can forward network traffic to/from the network manager device 16, the head-end server device 18, and/or the DHCP server device 22.

According to example embodiments, a root network device can initiate dynamic suspension of network operations in response to detecting an outage among at least a substantial number of constrained LLN devices in the LLN, minimizing network traffic that would otherwise interfere with outage messages or restoration messages destined for the root network device.

As illustrated in FIGS. 4A and 4B, the example embodiments can be implemented during initialization of the root network device 12 and each constrained LLN device 14b in the LLN 10, respectively, in cases where a wide-scale deployment of constrained LLN devices 14 is implemented as opposed to an incremental deployment of constrained LLN devices 14 as previously described. Hence, the root network device 12 can start from its initial state 80 and upon initialization (e.g., boot operations) at operation 82 the processor circuit 42 of the root network device 12 can initiate transmission of the collection-only mode DIO message 24b in state 84. Similarly, each constrained LLN device 14 can start from its initial state 86 and upon initialization at operation 88 can determine at operation 90 whether the received DIO specifies a collection-only mode based on the MOP field specifying "MOP=0". In response to detecting the collection-only mode DIO message 24b specifying "MOP=0" at operation 92, the processor circuit 42 of the constrained LLN device 14 can enter a "silent" state 94 and transmit only a PRN message 28, as appropriate.

In response to the processor circuit 42 of the root network device 12 detecting a substantial number of PRN messages 28 at operation 96 (corresponding to "YES" at operation 64 of FIG. 3B), the processor circuit 42 of the root network device 12 can execute operation 68 and begin transmission of the nonstoring mode DIO message 24a specifying nonstoring mode. The nonstoring mode DIO message 24a causes each constrained LLN device 14 to execute operation 70, illustrated in FIGS. 3B and 4B. As described previously, the processor circuit 42 of the root network device 12 in operation 98 (corresponding to "YES" of operation 54) can return to state 84 (corresponding to operation 60 of FIG. 3A) in response to detecting the substantial number of outage notification messages.

Hence, the example embodiments enable a dynamic RPL MOP toggle method where the root network device can dynamically change the mode of operation in a DODAG to prioritize survival tasks and suspend other non-critical operations (e.g., DHCP, non-critical reports of data and diagnostics, re-registrations to a network manager or application executed in the head-end server, etc.). The suspension of non-critical network operations enables power notifications to be collected by the root network device within battery lifetime, e.g., within two to fifteen minutes following an outage; the suspension of non-critical network operations also enables the network to be restored to full operations, in accordance with required service level agreements (SLA), within 10-30 minutes of power restoration.

Various optimizations can be added to the above-described operations. For example, one or more parent LLN devices (e.g., "A") 14 can be configured for responding to detecting a PON message 26 from a child LLN device (e.g., "D") 14 by executing its own suspension of forwarding any data traffic upward and/or downward in the DODAG 46, further reducing interference in its subDAG for reception of other PON messages generated from within the subDAG.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   detecting, by a root network device in a low power and lossy network (LLN) operating in a downward-routing mode, an outage among at least a substantial number of constrained LLN devices in the LLN;
   initiating, by the root network device, a dynamic suspension of network operations in the LLN during the outage, including causing existing Internet Protocol (IP) addresses of all the constrained LLN devices to be maintained during the outage, and causing all the constrained LLN devices to limit transmissions to Power Outage Notification (PON) messages, restoration messages, or minimal-bandwidth data packets, based on the root network device switching the LLN from the downward-routing mode to a collection-only mode; and
   selectively restoring, by the root network device, the LLN to the downward-routing mode in response to detecting the restoration messages from at least substantially all the substantial number of constrained LLN devices.

2. The method of claim 1, wherein the switching the LLN from the downward-routing mode to the collection-only mode comprises the root network device changing a mode of operation field in a DODAG information object (DIO) message from a first mode identifying the downward-routing mode as one of a storing mode or a nonstoring mode to a second mode that identifies that no downward routes are maintained by the root network device, and outputting the DIO message specifying the second mode into the LLN.

3. The method of claim 2, wherein the DIO message specifying the second mode causes each of the constrained LLN devices to suppress transmission of any advertisement message to the root network device during the outage and until reception of a root-initiated message indicating restoration of the LLN.

4. The method of claim 2, wherein the DIO message specifying the second mode causes each of the constrained LLN devices to suppress transmission of any message regarding allocation or extension of an Internet Protocol (IP) address, and further causes each of the constrained LLN devices to continue to use the corresponding existing IP address during the outage and until reception of a root-initiated message indicating restoration of the LLN.

5. The method of claim 2, The method of claim 2, wherein the DIO message specifying the second mode causes each of the constrained LLN devices to suppress transmission of any message to a network manager in the LLN.

6. The method of claim 1, wherein the causing existing Internet Protocol (IP) addresses to be maintained comprises the root network device generating and sending an instruction to a DHCP server to extend the respective existing IP addresses of the constrained LLN devices associated with an identified group for a prescribed time extension interval, wherein each of the constrained LLN devices is associated with the identified group.

7. The method of claim 1, wherein the detecting of the outage among at least a substantial number of constrained LLN devices in the LLN comprises:
receiving a corresponding PON message generated and output by a first of the constrained LLN devices; and
determining the substantial number based on identifying a number of child network devices relying on reachability to the root network device via the first constrained LLN device;
the method further comprising the root network device sending a notification, to a network manager, that the first constrained LLN device and the child network devices are unreachable;
wherein each restoration message is a Power Restoration Notification (PRN) message.

8. The method of claim 1, wherein the initiating dynamic suspension of network operations includes the root network device suppressing forwarding of any received data packets into the LLN that is operating in collection-only mode during the outage.

9. An apparatus implemented as a physical machine, the apparatus comprising:
non-transitory machine readable media configured for storing executable machine readable code;
a device interface circuit configured for receiving a data packet in a low power and lossy network (LLN); and
a processor circuit configured for executing the machine readable code, and when executing the machine readable code operable for:
detecting, by the apparatus implemented as a root network device in the LLN operating in a downward-routing mode, an outage among at least a substantial number of constrained LLN devices in the LLN,
initiating, by the root network device, a dynamic suspension of network operations in the LLN during the outage, including causing existing Internet Protocol (IP) addresses of all the constrained LLN devices to be maintained during the outage, and causing all the constrained LLN devices to limit transmissions to Power Outage Notification (PON) messages, restoration messages, or minimal-bandwidth data packets, based on the root network device switching the LLN from the downward-routing mode to a collection-only mode, and
selectively restoring, by the root network device, the LLN to the downward-routing mode in response to detecting the restoration messages from at least substantially all the substantial number of constrained LLN devices.

10. The apparatus of claim 9, wherein the processor circuit is configured for switching the LLN from the downward-routing mode to the collection-only mode based on changing a mode of operation field in a DODAG information object (DIO) message from a first mode identifying the downward-routing mode as one of a storing mode or a nonstoring mode to a second mode that identifies that no downward routes are maintained by the root network device, and causing the device interface circuit to output the DIO message specifying the second mode into the LLN.

11. The apparatus of claim 10, wherein the DIO message specifying the second mode causes each of the constrained LLN devices to suppress transmission of any advertisement message to the root network device during the outage and until reception of a root-initiated message indicating restoration of the LLN.

12. The apparatus of claim 10, wherein the DIO message specifying the second mode causes each of the constrained LLN devices to suppress transmission of any message regarding allocation or extension of an Internet Protocol (IP) address, and further causes each of the constrained LLN devices to continue to use the corresponding existing IP address during the outage and until reception of a root-initiated message indicating restoration of the LLN.

13. The apparatus of claim 10, wherein the DIO message specifying the second mode causes each of the constrained LLN devices to suppress transmission of any message to a network manager in the LLN.

14. The apparatus of claim 9, wherein the processor circuit is configured for causing existing Internet Protocol (IP) addresses to be maintained based generating, and causing the device interface circuit to send, an instruction to a DHCP server to extend the respective existing IP addresses of the constrained LLN devices associated with an identified group for a prescribed time extension interval, wherein each of the constrained LLN devices is associated with the identified group.

15. The apparatus of claim 9, wherein the processor circuit is configured for detecting the outage among at least a substantial number of constrained LLN devices in the LLN based on:
receiving a corresponding PON message generated and output by a first of the constrained LLN devices; and
determining the substantial number based on identifying a number of child network devices relying on reachability to the root network device via the first constrained LLN device;
the processor circuit further configured for generating, and causing the device interface circuit to send, a notification to a network manager, the notification indicating that the first constrained LLN device and the child network devices are unreachable;
wherein each restoration message is a Power Restoration Notification (PRN) message.

16. The apparatus of claim 9, wherein the processor circuit is configured for initiating the dynamic suspension of network operations based on suppressing forwarding of any received data packets into the LLN that is operating in collection-only mode during the outage.

17. One or more non-transitory tangible media encoded with logic for execution by a machine and when executed by the machine operable for:
   detecting, by the machine implemented as a root network device in a low power and lossy network (LLN) operating in a downward-routing mode, an outage among at least a substantial number of constrained LLN devices in the LLN;
   initiating, by the root network device, a dynamic suspension of network operations in the LLN during the outage, including causing existing Internet Protocol (IP) addresses of all the constrained LLN devices to be maintained during the outage, and causing all the constrained LLN devices to limit transmissions to Power Outage Notification (PON) messages, restoration messages, or minimal-bandwidth data packets, based on the root network device switching the LLN from the downward-routing mode to a collection-only mode; and
   selectively restoring, by the root network device, the LLN to the downward-routing mode in response to detecting the restoration messages from at least substantially all the substantial number of constrained LLN devices.

18. The one or more non-transitory tangible media of claim 17, wherein the causing existing Internet Protocol (IP) addresses to be maintained comprises the root network device generating and sending an instruction to a DHCP server to extend the respective existing IP addresses of the constrained LLN devices associated with an identified group for a prescribed time extension interval, wherein each of the constrained LLN devices is associated with the identified group.

19. The one or more non-transitory tangible media of claim 17, wherein the detecting of the outage among at least a substantial number of constrained LLN devices in the LLN comprises:
   receiving a corresponding PON message generated and output by a first of the constrained LLN devices; and
   determining the substantial number based on identifying a number of child network devices relying on reachability to the root network device via the first constrained LLN device;
   the one or more non-transitory tangible media further operable for sending a notification, to a network manager, that the first constrained LLN device and the child network devices are unreachable;
   wherein each restoration message is a Power Restoration Notification (PRN) message.

20. The one or more non-transitory tangible media of claim 17, wherein the initiating dynamic suspension of network operations includes the root network device suppressing forwarding of any received data packets into the LLN that is operating in collection-only mode during the outage.

* * * * *